Figure 3:
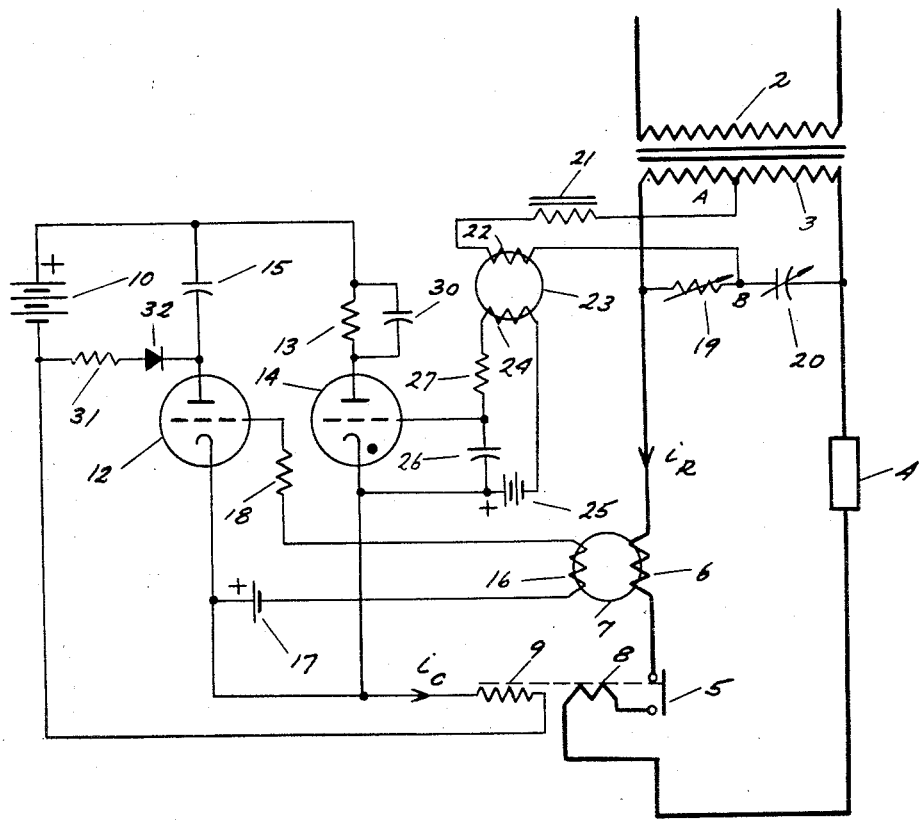

April 28, 1959  E. ROLF ET AL  2,884,586
CONTROL BYPASS CIRCUIT FOR ELECTROMAGNETIC RECTIFIERS
Filed Feb. 8, 1955  2 Sheets-Sheet 1
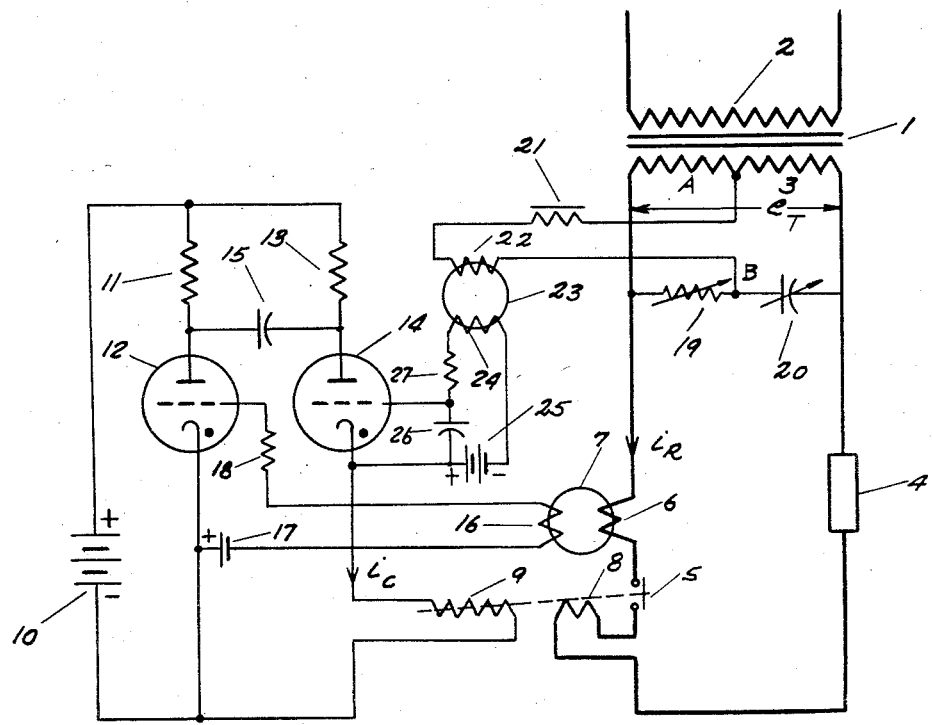
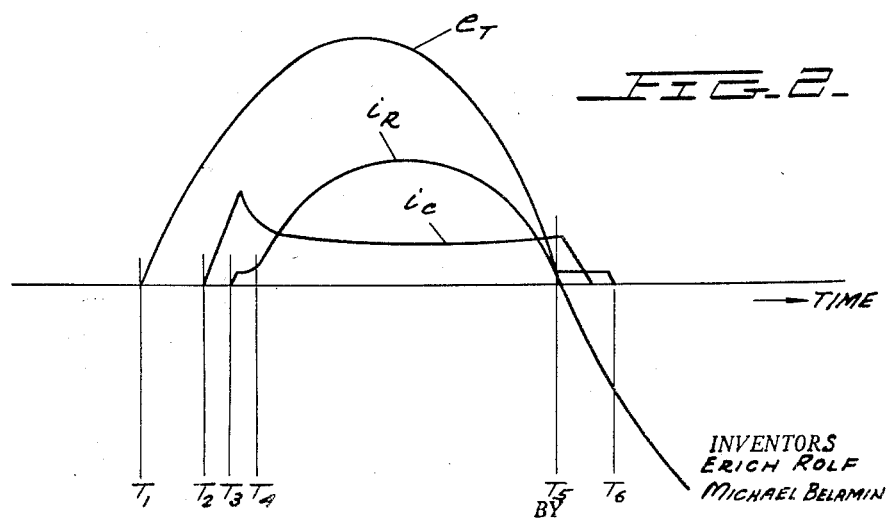
INVENTORS
ERICH ROLF
MICHAEL BELAMIN
*Ostrolenk & Faber*
ATTORNEYS

INVENTORS
ERICH ROLF
MICHAEL BELAMIN

United States Patent Office 2,884,586
Patented Apr. 28, 1959

2,884,586

CONTROL BYPASS CIRCUIT FOR ELECTROMAGNETIC RECTIFIERS

Erich Rolf and Michael Belamin, Nurnberg, Germany, assignors to Siemens-Schuckertwerke A.G., Berlin and Erlangen, Germany, a corporation of Germany Application February 8, 1955, Serial No. 486,963

6 Claims. (Cl. 321—48)

Our invention relates to a bypass circuit for electromagnetic rectifiers and is more particularly an improvement over the bypass circuit disclosed in our application Serial No. 278,386, filed March 25, 1952.

In the above mentioned application Serial No. 278,386, we have shown an electromagnetic rectifier having a power transformer, a commutating reactor which is a saturable type reactor, an electromagnetic switch and a D.-C. load. A bypass circuit is then placed in parallel with the commutating reactor and electromagnetic switch. The operation of this circuit is as follows.

When the potential of the A.-C. source is in the direction desired for the D.-C. load power, the bypass circuit operating on a closing coil of the electromagnetic switch causes the electromagnetic switch contacts to engage. Immediately after the electromagnetic switch contacts engage, the series commutating reactor unsaturates and remains unsaturated for a brief period of time thus giving the electromagnetic switch contacts a protective step immediately after their engagement.

When the potential of the alternating current subsequently reverses, it is desired to remove the potential from the D.-C. load. Thus, when the load current decreases to a value which is approximately zero, the commutating reactor once again unsaturates and the voltage across the commutating reactor is impressed on the bypass circuit in such a way as to cause rapid decrease of the bypass circuit current. Therefore, the current through the closing coil of the electromagnetic switch is driven to a value low enough to allow the electromagnetic switch contacts to disengage while the commutating reactor is still unsaturated. Hence, the electromagnetic switch contacts disengage during the protective step of the commutating reactor.

More particularly, the above bypass circuit shows a series connection of a thyratron, a current limiting resistor, a D.-C. biasing energy source, and a closing coil.

Variation of the output voltage to the D.-C. load is controlled by controlling the firing time of the thyratron thus varying the electromagnetic switch contacts closing point. There are, however, two distinct disadvantages in our bypass circuit of application Serial No. 278,386, filed March 25, 1952. The first disadvantage is that we show our thyratron as being controlled by some outside energy means. That is, the control means of the rectifier is completely independent of the rectifier operating conditions. A second disadvantage is that during the break, the commutating reactor must supply energy to drive down the bypass circuit current. Because of this, the magnetizing current of the commutating reactor during the break step is increased since it must supply the energy to drive down the bypass current. Hence, the instantaneous current which is broken by the electromagnetic switch contacts can be appreciably increased over the desired low current value of the commutating reactors inherent magnetizing current.

Our novel invention presents a method to overcome these two disadvantages and at the same time provides a bypass circuit which embodies all of the advantages of our prior invention.

We now provide a bypass circuit which energizes the closing coil of the electromagnetic switch but does not draw energy from the commutating reactor to de-energize the closing coil at the time desired to open the electromagnetic switch contacts. Furthermore, we show a novel bypass circuit which controls the energization of the closing coil thereby controlling the output voltage of the rectifier, and is responsive to the operation conditions of the rectifier.

The principle of our invention is as follows. We provide for a bypass circuit, two parallel circuits, each parallel circuit having an impedance, a controlled thyratron, and a mutual commutating condenser.

The thyratron of the first parallel circuit is controlled for firing responsive to predetermined conditions on the A.-C. source. The second thyratron is controlled to be fired when the commutating reactor break step is indicated. The two parallel circuits are then further arranged so that the current through the first thyratron circuit energizes the closing coil.

Upon unsaturation of the commutating reactor during the break, the second thyratron circuit is fired to thereby de-energize the closing coil by creating a parallel circuit to the first thyratron circuit and discharging the commutating capacitor in such a way as to transfer current from the first parallel circuit, which controls the closing coil, to the second parallel circuit thereby effecting a rapid decrease of current through the closing coil.

Our novel bypass circuit, therefore, is actually an auxiliary driven multi-vibrator circuit. That is, a system which oscillates in sequence with outside signals and independent of any inherent oscillating frequency. By using this type bypass circuit, power is not drawn from the commutating reactor during its break step since the commutating reactor voltage is only used for the grid cathode firing pulse of one of the thyratrons. Hence, no current drain is added to the step current of the commutating reactor.

We also show in the instant application a means to vary the firing point of the thyratron which controls the energization of the closing coil. We do this by providing a novel phase shifter which consists of a series variable resistor and variable capacitor connected in parallel to the rectifier A.-C. source. We then apply the potential difference between a tap on the A.-C. source and the mid-point of the variable resistor and variable condenser to a saturable type transformer.

In series with the saturable type transformer is a stabilizing choke which will phase-shift the point of unsaturation of the saturable transformer and also limit the current when the saturable type transformer is saturated. We then connect my saturable transformer in such a way as to fire the first thyratron when the saturable type transformer is unsaturated.

Now by varying either the resistor or the condenser, we phase-shift the voltage to the saturable type transformer, thereby varying the firing point of the first thyratron, thereby varying the output voltage of the rectifier. That is, by varying the firing point of the first thyratron, we vary the point of energization of the closing coil and hence, vary the time of engagement of the electromagnetic switch contacts.

Accordingly, a primary object of our invention is to provide a bypass circuit that does not draw magnetizing current from the commutating reactor.

Another object of our invention is to provide a bypass circuit which is controllable from a phase-shifting device to effect regulation of the output voltage.

Another object of our invention is to provide a driven multi-vibrator type bypass circuit having one phase to effect contact engagement and another phase to effect contact disengagement.

Still another object of our invention is to provide a driven multi-vibrator type bypass circuit in which contact engagement and contact disengagement are responsive to the rectifier operating contacts.

A still further object of our invention is to provide a bypass circuit having an operating potential which is independent of the rectifier potential thereby providing the use of safe potentials in the bypass circuit.

These and other objects of our invention will be apparent from the following description when taken in connection with the drawings in which:

Figure 1 shows a first embodiment of our invention.
Figure 2 shows the voltage current time relationships in conjunction with Figure 1.
Figure 3 shows a second embodiment of our invention.

Figure 1 shows, for simplicity, an embodiment of our invention as applied to a single phase half wave unit. The extension of our invention to a multi-phase rectifier will be obvious to anyone skilled in the art.

The electromagnetic switch of Figure 1 has an opening means which may be an electromagnetic means or a spring bias. For simplicity sake, the opening means is not shown in Figure 1 but can be of the type disclosed in copending application Serial No. 343,078, filed March 18, 1953, and assigned to the assignee of the instant application.

In Figure 1, the main rectifier is supplied from the main transformer 1 which has a primary winding 2 and a secondary winding 3. the D.-C. load 4 is connected to the secondary winding 3 by the electromagnetic switch cooperating contacts 5 which are in series with the winding 6 of the commutating reactor 7. The electromagnetic switch has a main current coil 8 and a closing coil 9.

The bypass circuit to which our novel invention is directed is shown as having a D.-C. power source 10. Power source 10 is in parallel with two circuits. The first parallel circuit contains resistor 11 and thyratron 12, and the second parallel circuit contains resistor 13 and a thyratron 14. As will be shown hereinafter, the current through the parallel circuit of resistor 13 and thyratron 14 will serve to energize the closing coil 9. The two parallel circuits are now linked by a capacitor 15.

Thyratron 12 is fired in response to the break step of commutating reactor 7 by means of the grid cathode bias provided by a circuit which is energized by auxiliary winding 16 of commutating reactor 7, biasing battery 17 and grid resistor 18.

The biasing circuit which fires thyratron 13 to thereby close cooperating contacts 5 is energized in response to the phase-shift created by variable resistor 19 and variable capacitor 20. The phase-shifted signal is then impressed on stabilizing choke 21 and winding 22 of the saturable type transformer 23. As long as saturable transformer 23 is unsaturated, the voltage across winding 22 will be reflected into winding 24. A constant grid bias for thyratron 13 is maintained by battery 25, condenser 26 and resistor 27. The tube is fired in response to the violent voltage pulse which is induced in winding 24 at a desired time which is predetermined by the adjustment of resistor 19 and capacitor 20.

The circuit operation of Figure 1 is as follows. It is assumed that it is desired to close the operating contacts 5. At this time, the potential difference between points A and B on transformer winding 3 and the phase-shifter comprising variable resistor 19 and variable capacitor 20 is at a value such that the saturable type transformer 23 is unsaturated.

A voltage pulse is induced in winding 24 to thereby fire thyratron 14. Upon firing of tube 14, battery 10 causes a current to flow through resistor 13, thyratron 14, holding coil 9 and back to battery 10. This is a rapidly rising current and is shown in Figure 2 as the current $i_c$ which begins to rise at time $T_2$. At time $T_3$, the ampere turns of coil 9 is at a value high enough to cause engagement of cooperating contacts 5. Upon engagement of the contacts 5, the main rectifier current shown as $i_R$ in Figure 2 is allowed to flow. However, commutating reactor unsaturates to thereby cause a protective low current make step for the cooperating contacts 5.

As shown in Figure 2, the make step lasts from $T_3$ to $T_4$ at which point, commutating reactor 7 unsaturates and the main rectifier current $i_R$ rises according to the load impedance and the voltage of secondary winding 3.

Note that during the time the current $i_c$ rises in the bypass circuit, commutating capacitor 15 charges up to have the positive voltage on the left-hand side.

When the transformer voltage $e_T$ of Figure 2 now decreases thereby decreasing the main rectifier current $i_R$, the rectifier current $i_R$ finally reaches a value at time $T_5$, shown in Figure 2, low enough to unsaturate the commutating reactor 7. It should be noted that the cooperating contacts 5 are maintained in engagement by the energization of the closing coil 9. However, when commutating reactor 7 unsaturates for its break step, a voltage is induced in coil 16 such that thyratron 12 will be fired.

Upon firing of thyratron 12, capacitor 15 which is positively charged on the left hand side now discharges through the thyratron 12, closing coil 9, thyratron 14, and back to the capacitor 15. Note that this discharge current is in such a direction as to buck down the holding coil current $i_c$. Figure 2 shows this decrease in $i_c$ starting at time $T_5$ when the commutating reactor 7 unsaturated to fire tube 12.

When the current $i_c$ reaches a low enough value, the opening bias of the electromagnetic switch will cause disengagement of cooperating contacts 5 during the break step. Note that the end of the break step is shown in Figure 2 at time $T_6$.

As soon as the current $i_c$ is at a low enough value thyratron 14 will extinguish and thyratron 12 will continue to fire through resistor 11. However, the resistance of resistor 11 is made high enough to prevent the required firing voltage to appear on thyratron 12. Therefore, the commutating reactor break step initiates the opening of the electromagnetic switch cooperating contacts 5 without drawing power from the commutating reactor 7.

In summary, the bypass circuit of Figure 1 provides two parallel paths for an auxiliary D.-C. source 10. The first parallel path is fired at a time desired to close the cooperating contacts 5 thereby impressing the D.-C. voltage of battery 10 across the closing coil 9 and at the same time charging the commutating capacitor 15. When the commutating reactor 7 subsequently begins its break step, the second parallel path is fired thereby presenting a closed circuit between the commutating condenser 15 and the two parallel branches containing two thyratrons, 12 and 14. Condenser 15 then discharges in such a way as to buck down the closing coil current $i_c$ to thereby effect disengagement of cooperating contacts 5 and subsequently cause extinguishment of thyratron 14. Thyratron 12 then lies in a closed circuit consisting of the D.-C. source 10 and a high resistor 11. However, the resistance of resistor 11 is so high that the required firing voltage for tube 12 is not provided and tube 12 is therefore extinguished.

It should be further noted that firing of thyratron 14 is responsive to the potential difference between points A and B, therefore, the thyratron 14 can always be fired at a predetermined point regardless of rectifier operating conditions.

A second embodiment of the circuit shown in Figure 1 is shown in Figure 3. In Figure 3, components identical to the components of Figure 1 carry the same numbers.

Thyratron 14 of Figure 3 is fired to initiate the engagement of cooperating contacts 5 of the electromagnetic switch in the exact same manner as was described in connection with Figure 1. After thyratron 14 fires, D.-C. source 10 initiates the closing coil current through the circuit comprising parallel resistor 13, capacitor 30, thyratron 14 and closing coil 9.

As soon as the current $i_c$ rises to a value high enough in closing coil 9, electromagnetic switch contacts 5 engage, the commutating reactor 7 unsaturates to provide a make step for the contact and after saturation of commutating reactor 7, main current flows through the load 4.

When the load current subseqently decreases to a value low enough to once again unsaturate the commutating reactor 7, thyratron 12 is fired. Upon firing of thyratron 12, current from the D.-C. source 10 can now flow through the commutating capacitor 15, thyratron 12, closing coil 9 and back to the D.-C. voltage source 10.

Since the impedance of this branch is made to be lower than the impedance of the branch containing thyratron 14, the closing coil current is transferred from the branch containing thyratron 14 to the parallel branch containing thyratron 12.

It should be noted that condenser 15 now has a positive charge on the top due to the flow of current through the newly initiated branch of thyratron 12. When the current in the branch containing thyratron 14 decreases to a value low enough, thyratron 14 extinguishes.

An oscillating circuit is now created which contains the charged condenser 15 in series with the inductance of the closing coil 9. By suitably choosing the values of the inductance of coil 9 and the capacitance of capacitor 15, the closing coil current will have a frequency such that a low enough instantaneous current in coil 9 can be achieved at a desired time to allow disengagement of cooperating contacts 5 while the commutating reactor 7 is in its break step.

When this oscillating current achieves a still lower value, tube 12 will be extinguished. The remainder of the charge on capacitor 15 is then discharged through battery 10, high resistance 31 and dry cell rectifier 32.

In summary, the embodiment of Figure 3 provides a D.-C. source feeding the closing coil 9 through two parallel branches, one containing thyratron 12 and a capacitor 15 and the second containing thyratron 14 and impedances 13 and 30. The current through the branch containing thyratron 14 is the current which is used to energize closing coil 9. At the break step, the parallel circuit containing thyratron 12 is fired thus short-circuiting the parallel branch containing thyratron 14. Thyratron 14 subsequently extinguishes and the parallel circuit containing thyratron 12 and condenser 15 now carries the full current thus discharging condenser 15. Therefore, by firing the parallel circuit containing the thyratron 12, we have first provided a short-circuit for the parallel branch containing thyratron 14 and secondly, we have provided a shorting circuit comprising the capacitance of capacitor 15 and the inductance of coil 9.

According to the natural oscillating frequency of the above mentioned oscillating circuit, the time at which the ampere turns in coil 9 are insufficient to maintain cooperating contacts 5 in engagement is determined. Furthermore, when the oscillating circuit begins to swing current more negatively, thyratron 12 will extinguish. The remainder of the charge on capacitor 15 is subsequently discharged through the circuit comprising the battery 12, high resistance 31 and dry cell rectifier 32.

It should be noted that the embodiment of Figure 3 does not draw current from the commutating reactor winding 16 to thereby influence the magnetizing current in coil 6 during the break step.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. In an electromagnetic rectifier energizing a D.-C. load from an A.-C. source, said electromagnetic rectifier having a commutating reactor and electromagnetic switch; said commutating reactor having a main winding and an auxiliary winding; said electromagnetic switch having cooperating contacts, a main coil, a closing coil and opening means; said A.-C. source connected in series with said commutating reactor main winding, electromagnetic switch main winding, electromagnetic switch operating contacts and D.-C. load; an auxiliary circuit to control energization of said closing coil; said auxiliary circuit comprising a first circuit and a second circuit connected in parallel; said parallel connection of said first and second circuits connected in parallel to a D.-C. source; said first circuit comprising a first resistor and a first thyratron connected in series; said second circuit comprising a second resistor, a second thyratron and said closing coil in series; a commutating capacitor having one end connected between said first resistor and said first thyratron and the other end connected between said second resistor and said second thyratron; said first thyratron having a grid cathode circuit constructed to fire said first thyratron in response to the induced voltage appearing on said commutating reactor circuit when said commutating reactor unsaturates for the break step; said second thyratron having a grid cathode circuit in which means are provided to supply a voltage pulse which is adjustable to fire said second thyratron at a desired time; said adjustable pulse means comprising a saturable type transformer to energize said grid cathode circuit of said second thyratron when said saturable type transformer is unsaturated; a phase shifting circuit to energize said saturable type transformer; said phase shifting circuit comprising said A.-C. voltage source, a variable resistor and a variable condenser; said variable resistor and variable condenser connected in series with each other and in parallel with said A.-C voltage source, the potential difference of a center tap of said voltage source and the connecting point of said variable resistor and said variable condenser applied to a series connection of an inductor and said saturable type transformer.

2. In an electromagnetic rectifier feeding a D.-C. load from an A.-C. source said electromagnetic rectifier having a commutating reactor and an electromagnetic switch; said commutating reactor having a main winding and an auxiliary winding; said electromagnetic switch having cooperating contacts, a main coil, a closing coil and opening means; said A.-C. source connected in series with said commutating reactor main winding, electromagnetic switch main winding, electromagnetic switch cooperating contacts and D.-C. load; an auxiliary circuit to control energization of said closing coil; said auxiliary circuit comprising a first circuit and a second circuit connected in parallel; said parallel connection of said first and second circuits connected in parallel to a D.-C. source; said first circuit comprising a first resistor and a first thyratron connected in series; said second circuit comprising a second resistor, a second thyratron and said closing coil connected in series; a commutating capacitor having one end connected between said first resistor and said first thyratron and the other end connected between said second resistor and said second thyratron; said first thyratron having a grid cathode circuit constructed to fire said first thyratron in response to the induced voltage appearing on said commutating reactor circuit when said commutating reactor unsaturates during the break step of said cooperating contacts; said second thyratron having a grid cathode circuit constructed to supply a voltage pulse which is adjustable to fire said second thyratron at a predetermined time.

3. In an electromagnetic rectifier feeding a D.-C. load from an A.-C. source, said electromagnetic rectifier having a commutating reactor and an electromagnetic switch; said commutating reactor having a main winding and an auxiliary winding; said electromagnetic switch having cooperating contacts, a main coil, a closing coil and opening means; said A.-C. source connected in series with said commutating reactor main winding, electromagnetic switch main winding, electromagnetic switch cooperating contacts and D.-C. load; an auxiliary circuit to control energization of said closing coil; said auxiliary circuit comprising a driven multivibrator circuit which provides a first and a second current path for a D.-C. voltage source; said closing coil in series with said first current path; said first path to be energized at a time responsive to the adjustment of a phase shifting circuit; said phase shifting circuit comprising said A.-C. source in parallel with a series connected variable resistor and variable condenser; the energy of said phase shifting circuit to be supplied from the potential difference between the connecting point of said variable resistor and variable condenser, and a point on said A.-C. source; said second current path to be energized in response to the unsaturation of said commutating reactor to thereby effect de-energization of said closing coil.

4. In an electromagnetic rectifier feeding a D.-C. load from an A.-C. source, said electromagnetic rectifier having a commutating reactor and an electromagnetic switch; said commutating reactor having a main winding and an auxiliary winding; said electromagnetic switch having cooperating contacts, a main coil, a closing coil and opening means; said A.-C. source connected in series with said commutating reactor main winding, electromagnetic switch main winding, electromagnetic switch cooperating contacts and D.-C. load; an auxiliary circuit to control energization of said closing coil; said auxiliary circuit comprising in parallel a first and second current path, a D.-C. source; said battery, parallel first and second current paths and said closing coil forming a closed series circuit; said first current path comprising a commutating capacitor and a first thyratron; said second current path comprising in series a parallel connected resistor and capacitor and a second thyratron; a discharge circuit comprising in series a diode, a current limiting resistor, said D.-C. source and said commutating capacitor; said diode positioned to oppose said D.-C. source voltage; said first thyratron having a grid cathode circuit constructed to fire said first thyratron in response to the induced voltage appearing on said commutating reactor circuit when said commutating reactor unsaturates for the break step of said cooperating contacts; said second thyratron having a grid cathode circuit in which means are provided to supply a voltage pulse which is adjustable to fire said second thyratron at a desired time; said adjustable pulse means comprising a saturable type transformer to deliver energy to said grid cathode circuit of said second thyratron as long as said saturable type transformer is unsaturated; a phase shifting circuit to energize said saturable type transformer; said phase shifting circuit comprising said A.-C. voltage, a variable resistor and a variable condenser; said variable resistor and variable condenser connected in series with each other and in parallel with said A.-C. voltage source; the potential difference of a center tap of said voltage source and the connecting point of said variable resistor and said variable condenser applied to a series connection of an inductor and said saturable type transformer.

5. In an electromagnetic rectifier feeding a D.-C. load from an A.-C. source, said electromagnetic rectifier having a commutating reactor and an electromagnetic switch; said commutating reactor having a main winding and an auxiliary winding; said electromagnetic switch having cooperating contacts, a main coil, a closing coil and opening means; said A.-C. source connected in series with said commutating reactor main winding, electromagnetic switch main winding, electromagnetic switch cooperating contacts and D.-C. load; an auxiliary circuit to control energization of said closing coil; said auxiliary circuit comprising in parallel a first and second current path, a D.-C. source, and said closing coil, said battery, parallel first and second current paths and said closing coil forming a closed series circuit; said first current path comprising a commutating capacitor and a first thyratron; said second current path comprising in series a parallel connected resistor and capacitor and a second thyratron; a discharge circuit comprising in series a diode, a current limiting resistor, said D.-C. source and said commutating capacitor; said diode positioned to prevent said D.-C. source from circulating current around said discharge circuit; said first thyratron having a grid cathode circuit constructed to fire said first thyratron in response to the induced voltage appearing on said commutating reactor circuit when said commutating reactor unsaturates during the break step of said cooperating contacts; said second thyratron having a grid cathode circuit in which means are provided to supply a voltage pulse which is adjustable to fire said second thyratron at a desired time.

6. In an electromagnetic rectifier energizing a D.-C. load from an A.-C. source, said electromagnetic rectifier having a commutating reactor and an electromagnetic switch; said commutating reactor having a main winding and an auxiliary winding; said electromagnetic switch having cooperating contacts, a main coil, a closing coil and opening means; said A.-C. source connected in series with said commutating reactor main winding, electromagnetic switch main winding, electromagnetic switch cooperating contacts and D.-C. load; an auxiliary circuit to control energization of said closing coil; said auxiliary circuit comprising a first circuit and a second circuit connected in parallel; said parallel connection of said first and second circuits connected in parallel to a D.-C. source; said first circuit comprising a first impedance and a first thyratron connected in series; said second circuit comprising a second impedance and a second thyratron; said closing coil connected to be energized by the current flowing in said second circuit and de-energized when current flows in said first circuit; a commutating capacitor having one end connected between said first resistor and said first thyratron and the other end connected between said second resistor and said second thyratron; said first thyratron having a grid cathode circuit constructed to fire said first thyratron in response to the induced voltage appearing on said commutating reactor circuit when said commutating reactor unsaturates for the break step of said cooperating contacts; said second thyratron having a grid cathode circuit in which means are provided to supply a voltage pulse which is adjustable to fire said second thyratron at a predetermined time; said adjustable pulse means comprising a saturable type transformer to energize said grid cathode circuit of said second thyratron when said saturable type transformer is unsaturated; a phase shifting circuit to energize said saturable type transformer; said phase shifting circuit comprising said A.-C. voltage, a variable resistor and a variable condenser; said variable resistor and variable condenser connected in series with each other and in parallel with said A.-C. voltage source, the potential difference of a center tap of said voltage source and the connecting point of said variable resistor and said variable condenser applied to a series connection of an inductor and said saturable type transformer.

References Cited in the file of this patent

UNITED STATES PATENTS 2,777,982    Rolf  ---------------- Jan. 15, 1957

FOREIGN PATENTS 904,091    Germany  ------------- Feb. 15, 1954